United States Patent
Wise et al.

(10) Patent No.: US 10,864,623 B2
(45) Date of Patent: Dec. 15, 2020

(54) CONVERTIBLE INTELLIGENT POWER TOOL

(71) Applicant: Apex Brands, Inc., Apex, NC (US)

(72) Inventors: David Wise, Lexington, SC (US); Phillip Bua, Rochester, MI (US)

(73) Assignee: APEX BRANDS, INC., Apex, NC (US)

( * ) Notice: Subject to any disclaimer, the term of this patent is extended or adjusted under 35 U.S.C. 154(b) by 424 days.

(21) Appl. No.: 15/534,722

(22) PCT Filed: Dec. 14, 2015

(86) PCT No.: PCT/US2015/065560
§ 371 (c)(1),
(2) Date: Jun. 9, 2017

(87) PCT Pub. No.: WO2016/100213
PCT Pub. Date: Jun. 23, 2016

(65) Prior Publication Data
US 2017/0368674 A1    Dec. 28, 2017

Related U.S. Application Data

(60) Provisional application No. 62/092,047, filed on Dec. 15, 2014.

(51) Int. Cl.
*B25F 1/04* (2006.01)
*G05B 19/409* (2006.01)
(Continued)

(52) U.S. Cl.
CPC .............. *B25F 1/04* (2013.01); *B25B 21/002* (2013.01); *B25B 23/15* (2013.01); *B25F 3/00* (2013.01);
(Continued)

(58) Field of Classification Search
CPC ... B25F 1/04; B25F 3/00; B25F 5/001; G05D 17/02; G05B 2219/36159;
(Continued)

(56) References Cited

U.S. PATENT DOCUMENTS 5,315,501 A * 5/1994 Whitehouse .......... B23P 19/066
173/176
5,637,968 A * 6/1997 Kainec .................. B23P 19/066
173/5
(Continued)

FOREIGN PATENT DOCUMENTS

CN    102844720 A    12/2012
GB      2283112 A     4/1995

OTHER PUBLICATIONS

Cleco, Cleco DC Electric Assembly Tools, Product document, pp. 1-98, Jan. 1, 2012, SP-1020EN 7.5M 0212, Apex Tool Group, LLC.
(Continued)

Primary Examiner — Anna K Kinsaul
Assistant Examiner — Daniel Jeremy Leeds
(74) Attorney, Agent, or Firm — Coats & Bennett, PLLC

(57) ABSTRACT

A convertible power tool that can operate in first and second configurations. The tool includes a base unit configured to receive at one time either a first module or a second module. The different modules provide for different levels of functionality. The first module includes one or more components that provide for a first level of functionality. The second module includes one or more components that provide for an advanced second level of functionality. Each of the base unit and first and second modules may include interfaces that provide for physical engagement as well as power/data engagement. In use, one of the first and second modules is connected to the base unit to provide for the desired functionality incorporated with the tool. The tool may also be reconfigured by removing the attached module and replacing (Continued)

it with the other module thus providing for a different functionality level.

14 Claims, 11 Drawing Sheets

(51) Int. Cl.
    *B25F 3/00*           (2006.01)
    *B25B 21/00*         (2006.01)
    *B25B 23/15*         (2006.01)
    *B25F 5/00*          (2006.01)
    *G01D 11/24*         (2006.01)
    *G01D 21/02*         (2006.01)
    *G05D 17/02*         (2006.01)

(52) U.S. Cl.
    CPC ............ *B25F 5/001* (2013.01); *G05B 19/409* (2013.01); *G01D 11/24* (2013.01); *G01D 21/02* (2013.01); *G05B 2219/36159* (2013.01); *G05B 2219/45127* (2013.01); *G05D 17/02* (2013.01)

(58) Field of Classification Search
    CPC ........ G05B 2219/45127; G05B 19/409; G01D 11/24; G01D 21/02; B25B 21/002; B25B 23/15
    See application file for complete search history.

(56) References Cited

U.S. PATENT DOCUMENTS

| | | | |
|---|---|---|---|
| 7,090,031 B2 | 8/2006 | Kaminksi | |
| 8,468,231 B1 | 6/2013 | Vance | |
| 10,131,042 B2* | 11/2018 | Mergener | B23B 47/00 |
| 2005/0205275 A1* | 9/2005 | Kaminski | B23P 19/066 |
| | | | 173/2 |
| 2010/0265097 A1* | 10/2010 | Obatake | B25B 21/00 |
| | | | 340/870.4 |
| 2013/0018400 A1* | 1/2013 | Milton | A61B 90/06 |
| | | | 606/167 |
| 2013/0118767 A1* | 5/2013 | Cannaliato | B25F 5/021 |
| | | | 173/29 |
| 2013/0304851 A1 | 11/2013 | Vance | |
| 2014/0090224 A1* | 4/2014 | Khalaf | B25B 23/14 |
| | | | 29/407.02 |

OTHER PUBLICATIONS

DGD, "Intelligent Spindles. Your Solution to Increased Productivity", pp. 1-8, Jan. 1, 2012, SP-706-EN 0212 5M, Apex Tool Group, LLC.

* cited by examiner

CONVERTIBLE INTELLIGENT POWER TOOL

RELATED APPLICATIONS

This application claims priority to U.S. Provisional patent Application Ser. No. 62/092,047 filed 15 Dec. 2014 entire contents of which are incorporated herein by reference.

TECHNICAL FIELD

The present application is directed to convertible power tools with a base unit that can receive different attachment modules that provide for different levels of functionality.

BACKGROUND

There are many advantages for power tools that can be converted for use in different environments and for different working situations. One advantage is this type of tool is more cost effective. The tool can be converted and used in each situation, thus preventing the user from having to purchase separate tools to handle the different situations. Further, when the tool is in use, such as on an assembly line, it may be faster to convert the tool for different uses than to switch between first and second tools.

Converting a single tool may allow for the tool to remain attached within a work area, such as within tool cluster or remain attached to a robotic device. Conversely, detaching the first tool, removing it from the work area, inserting a second tool, and attaching the second tool at the work area may be a lengthy process. The tool may also be located at a physically difficult position for an operator to reach. Converting the single tool may be relatively easy as compared to removing and replacing the tools.

SUMMARY

The present application is directed to a convertible tooling system that includes a common base unit and multiple different interchangeable attachments. Each of the attachments includes different components and offers different capabilities for operation of the base unit. The convertible design provides for interchangeability of components to accommodate the needs of the user.

One embodiment is directed to a tool that can be converted to be used in one of a first configuration and a second configuration. The tool includes a base unit, a servo-free module, and a servo amplifier module. The base unit receives power and data communications from a remote source. The base unit includes a motor an output drive that is driven by the motor, and a housing with a mounting platform and that extends around the motor and the output drive. The servo-free module includes a first connector interface, and a first housing that extends around the first connector interface and that includes a first mount. The servo-free module does not include a servo amplifier. The servo amplifier module includes a servo amplifier, a processing circuit, a second connector interface, and a second housing that extends around the servo amplifier, the processing circuit, and the second connector interface. The second housing includes a second mount. The mounting platform of the base unit is configured to removably connect at one time to the servo-free module or the servo amplifier module. A first configuration includes the servo-free module physically and electrically removably connected to the base unit with the power and data communications from the remote source that are received at the base unit passing through the servo-free module. A second configuration includes the servo amplifier module physically and electrically removably connected to the base unit with the power and data communications from the remote source that are received at the base unit passing through the servo amplifier module.

The tool may also include a base port positioned at the mounting platform, a first port positioned at the first mount, and a second port positioned at the second mount. The first configuration includes the first port physically and electrically engaging with the base port of the base unit, and the second configuration including the second port physically and electrically engaging with the base port of the base unit.

The tool may include that the base unit further includes a torque transducer and a gear unit.

The tool may include that each of the servo-free module and the servo module include a display screen.

The tool may include that the motor of the base unit is configured to be adjustable based on signals received from a remote servo amplifier.

The tool may include that the servo amplifier includes an analog-to-digital converter.

Another embodiment is directed to a method of operating a tool. The method includes: electrically and physically attaching a servo-free module to a base unit with the servo-free module positioned at a mounting position on the base unit and that the servo-free module does not include a servo amplifier; operating the tool in a first configuration while power and data from a remote source pass through the servo-free module to the base unit; removing the servo-free module from the base unit; electrically and physically attaching a servo module at the mounting position on the base unit where the servo-free module was previously attached with the servo module comprising a servo amplifier; operating the tool in a second configuration while power and data from the remote source pass through the servo module to the base unit; and monitoring a motor in the base unit with the servo amplifier in the servo module while operating the tool in the second configuration.

The method may further include engaging a base port on the base unit with a first port on the servo-free module while the tool is in the first configuration and with a second port on the servo module while the tool is in the second configuration.

The method may further include performing analog-to-digital conversions of motor signals at the servo amplifier.

The method may further include attaching the servo module to a downstream tool and transferring power and data information through the servo module to the downstream tool.

The method may further include contacting a first housing of the servo-free module against a housing of the base unit in the first configuration and contacting a second housing of the servo module against the housing of the base unit in the second configuration.

The method may include deactivating the base unit by detaching both the servo-free module and the servo module from the base unit.

The method may include attaching a power and data cable to the servo-free module in the first configuration and to the servo module in the second configuration.

The method may include attaching the second module to the base unit and positioning the servo amplifier on the exterior of the housing of the base unit.

One embodiment is directed to a convertible tooling system that includes a base unit with a motor, gearing, an output drive, and a receptacle. The system also includes a first attachment configured to be attached to the base unit at the receptacle. The first attachment includes a connector interface and a display. The system also includes a second attachment configured to be attached to the base unit at the receptacle. The second attachment includes a processing circuit, a servo amplifier, a transducer, a connector interface, and a display. The receptacle on the base unit is configured to receive just one of the first and second attachments at a time.

The receptacle may include a single mounting position configured to receive one of the first and the second attachments.

The receptacle may include multiple mounting positions that are each configured to receive at least one of the first and second attachments.

Another embodiment is directed to a convertible tooling system and includes a base unit including a motor and a receptacle. The system also includes a first attachment configured to be attached to the base unit at the receptacle. The first attachment includes a connector interface to send and receive signals from the motor and a display. The system also includes a second attachment configured to be attached to the base unit at the receptacle. The second attachment includes a processing circuit and a servo amplifier configured to send and receive signals with the motor and control the operation of the motor. The receptacle is configured to receive just one of the first and second attachments at a time.

Another embodiment is directed to a method of using a convertible tooling system. The method includes: attaching a first attachment unit to a base unit with the first attachment including a display to display information regarding operation of a motor in the base unit without controlling operation of the motor; detaching the first attachment unit from the base unit; attaching a second attachment unit to the base unit with the second attachment including a servo amplifier configured to control operation of the motor.

The various aspects of the various embodiments may be used alone or in any combination, as is desired.

DETAILED DESCRIPTION

The present application is directed to a convertible power tool that can operate in first and second configurations. The convertible power tool includes a base unit configured to receive at one time either a first module or a second module. The different modules provide for different levels of tool functionality. The first module includes one or more components that provide for a first level of functionality. The second module includes one or more components that provide for an advanced second level of functionality. Each of the base unit and first and second modules include interfaces that provide for physical engagement as well as power/data engagement. In use, one of the first and second modules is connected to the base unit to provide for the desired functionality incorporated with the tool. The tool may also be converted by removing the attached module and replacing it with the other module thus providing for a different functionality level.

Figure 1:
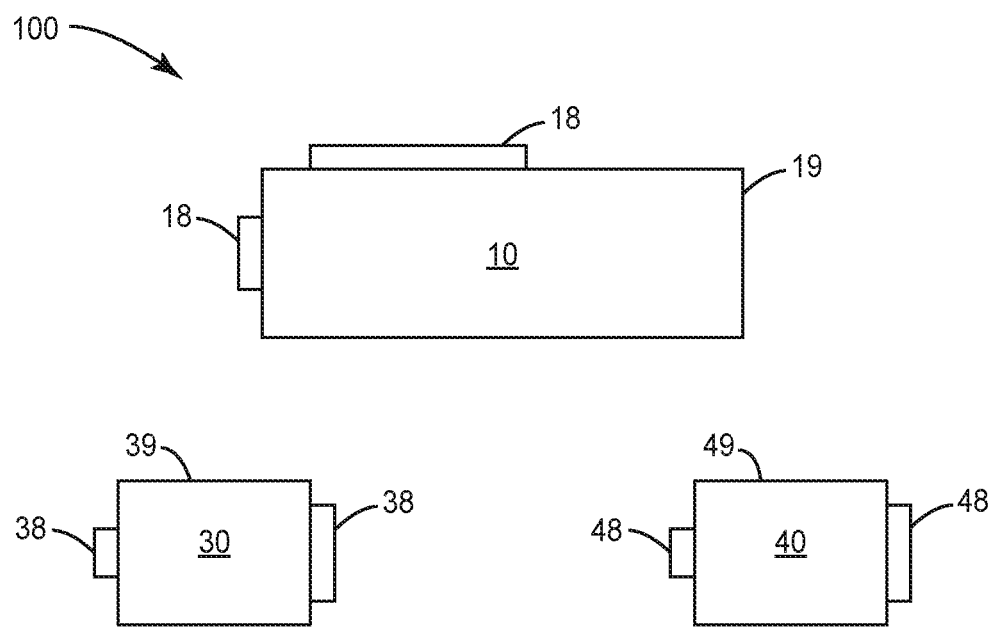
FIG. 1 is a schematic view of a tool in a disassembled state that includes a base unit that is attachable to a first module and a second module.

FIG. 1 schematically illustrates a tool 100 that includes the base unit 10 and the first and second modules 30, 40. The base unit 10 includes a protective housing 19 that extends around the interior components. One or more mounting platforms 18 are positioned along the housing 19 to engage with the modules 30, 40. The platforms 18 may include one or more ports for operatively connecting the power and/or data communications with the modules 30, 40. FIG. 1 includes a pair of platforms 18, although other embodiments may include a single platform 18 or three or more platforms 18. In embodiments with multiple platforms 18, each may be the same or they may be different. The platforms 18 also provide for physical engagement between the base unit 10 and the modules 30, 40.

The platforms 18 may include various engagement features to connect with the modules 30, 40. Features include but are not limited to rails, indents, clips, and receptacles to receive fasteners. The platforms 18 may also include one or more ports for receiving and/or sending power and/or data to and from an upstream source. In one embodiment, the platforms 18 include a male/female attachment with the modules 30, 40.

Each of the first and second modules 30, 40 are configured to attach to the base unit 10 at one of the platforms 18. Each of the modules 30, 40 includes a protective housing 39, 49 respectively that extend around the internal components. Each of the modules 30, 40 also includes one or more mounting platforms 38, 48 respectively that may each include one or more ports. The platforms 38, 48 provide for connecting with the base module 10 and connecting with upstream controllers such as through one or more cables. The platforms 38, 48 may include various features to provide for the connection, such as rails, indents, clips, and receptacles to receive fasteners, as well as to provide for operative connection for transferring power and/or data.

Figure 2:
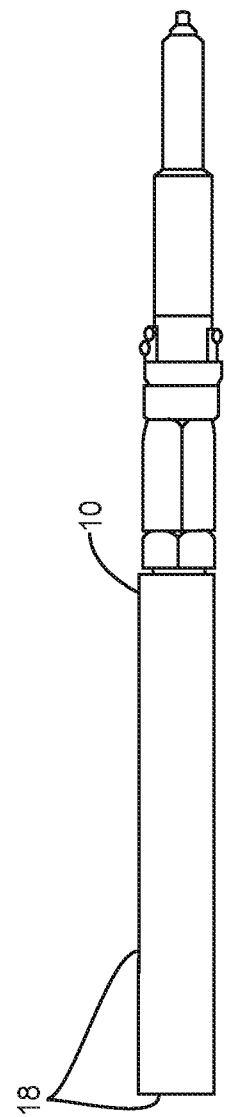
FIG. 2 is a side view of a tool in a disassembled state including a base unit, a first module, and a second module.
Figure 2:
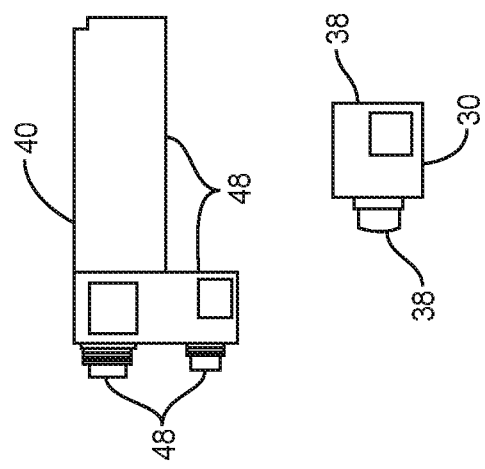

FIG. 2 illustrates the modules 30, 40 that can be attached to the base unit 10. The second module 40 may be physically larger than the first module 30. This size difference is caused by the increased logic functionality in the second module 40. As illustrated in FIG. 2, the modules 30, 40 also include outboard platforms 38, 48 for connecting with other components in the tooling system 200 for the transmission of data/power.

Figure 3:
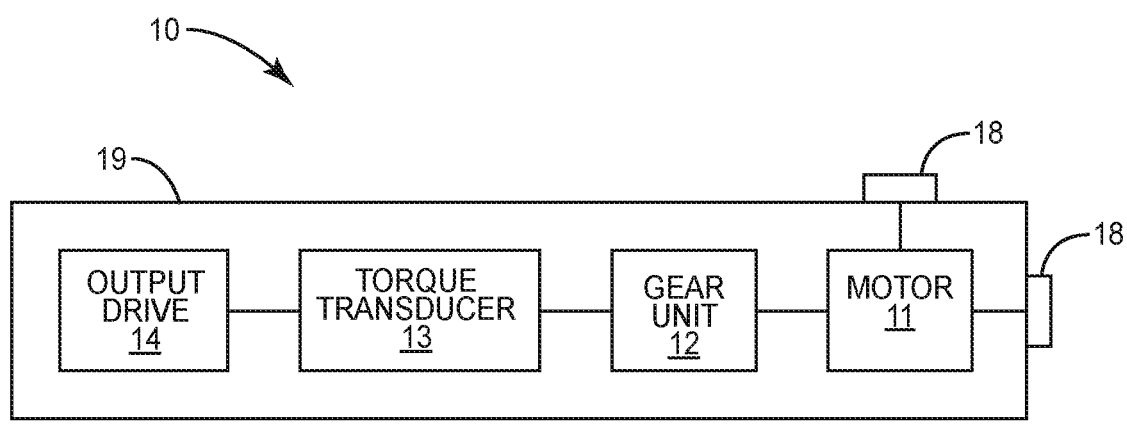
FIG. 3 is a schematic view of a base unit.

FIG. 3 schematically illustrates the components of the base unit 10. The base unit 10 includes a motor 11, gear unit 12, torque transducer 13, and an output drive 14 that are positioned within an exterior housing 19. The motor 11 is electrically powered and produces a rotational force. The gear unit 12 couples the rotational force from the motor 11 to the output drive 14. The torque transducer 13 is operative to monitor the drive motor 11, the gear unit 12, and/or the output drive 14. The measurement transducer 13 may be configured to measure one or more parameters such as rotated angle, applied torque, or first derivatives of either of these parameters with respect to time. The output drive 14 may be straight, offset, or angled, as needed or desired.

Figure 4:
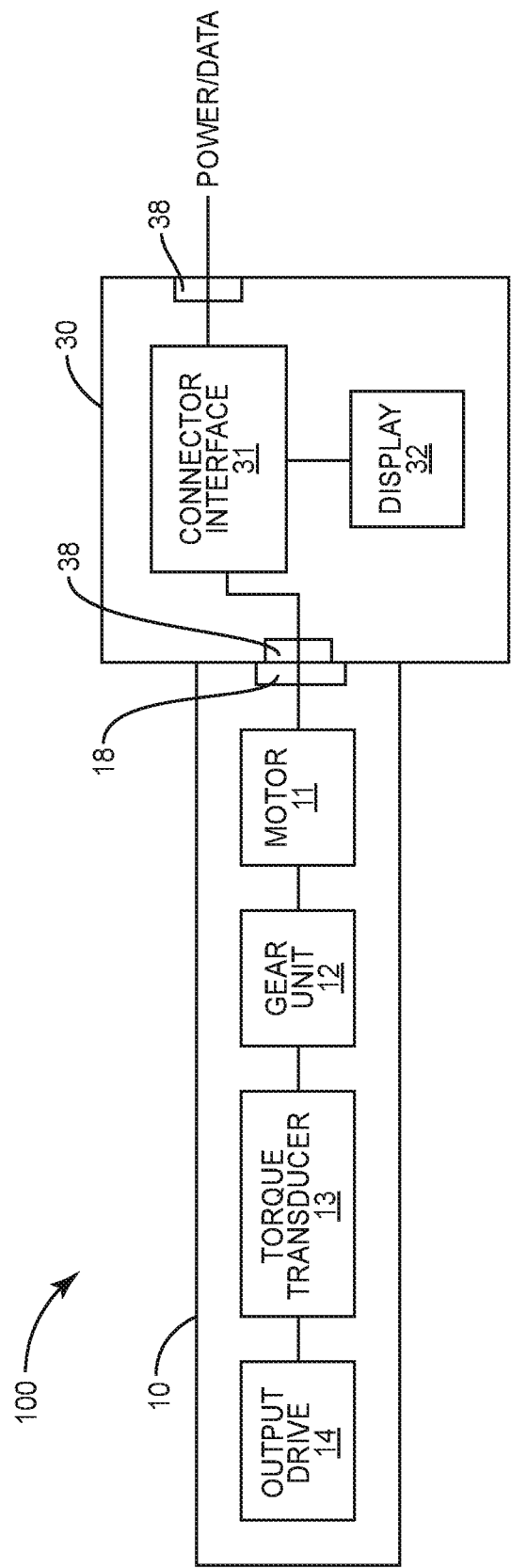
FIG. 4 is a schematic view of a tool in a first configuration with a base unit attached to a first module.
Figure 5:
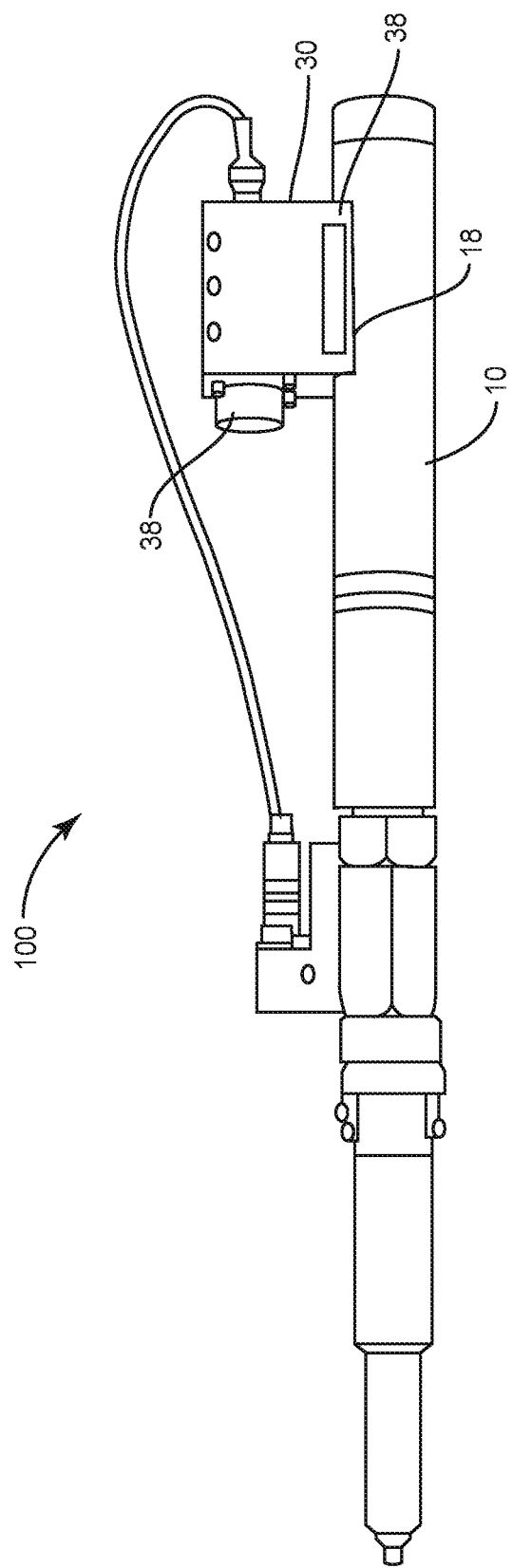
FIG. 5 is a side view of the tool of FIG. 4.

FIGS. 4 and 5 illustrate a first module 30 attached to the base unit 10 at the platform 18. The platforms 18, 38 are engaged together providing for a physical connection as well as transfer of data and/or power from the first module 30 to the base unit 10. Further, first module 30 includes an outboard second platform 38 for attachment with cables to receive power and/or data from an upstream source. The connector interface 31 may also include an address device, for example in the form of rotary switches to send and receive signals from the control processor. A display 32 is provided on the first module 30 that includes a screen for indicating operational aspects of the tool 100. The display 32 may be a conventional liquid crystal display (LCD) or a touch screen display. One or more inputs may also be associated with the display 32 for the operator to toggle between viewing the various different operational features.

The first module 30 does not include a servo amplifier. This is advantageous for use in conditions in which the working environment could damage the servo amplifier or otherwise prevent its proper functioning. Thus, the servo amplifier is positioned remote from the first module 30 within an upstream controller.

Figure 6:
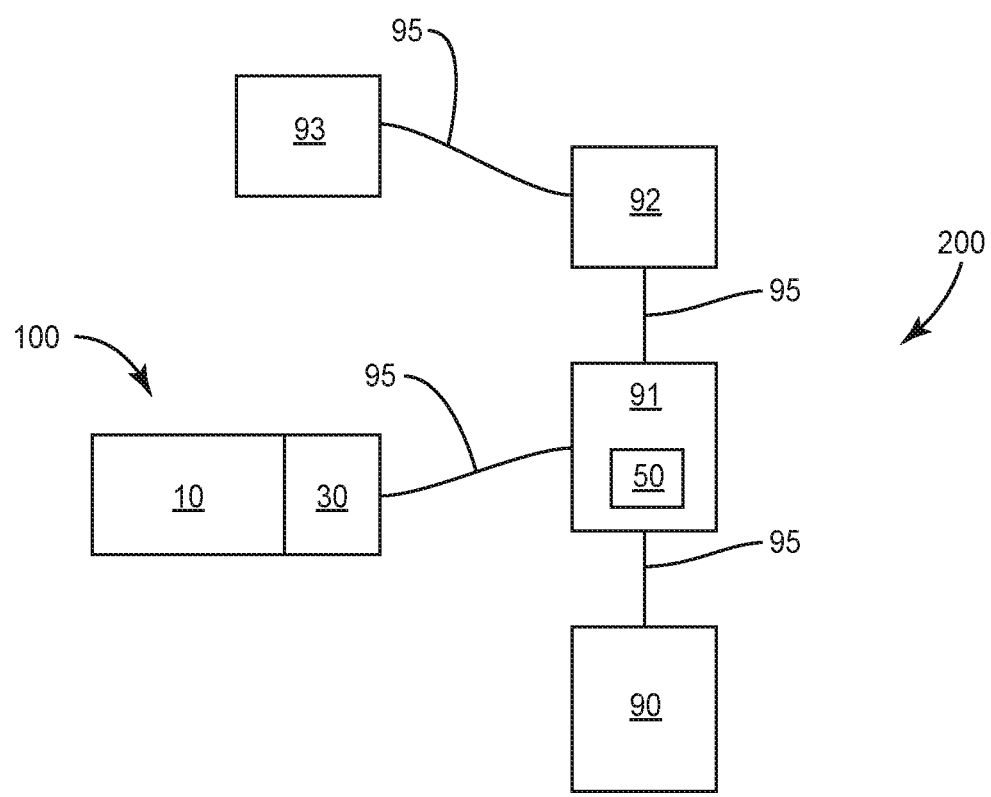
FIG. 6 is a schematic view of a tool positioned within a tooling system.

FIG. 6 illustrates the tool 100 that includes the base unit 10 and the first module 30 within a tooling system 200. A tool controller 91 controls the operation of the one or more tools 100. A system controller 90 controls and oversees the operation of the tooling system 200 through the tool controller 91. A robotic device 93 is configured to position the tools 100 at the desired operating position. A power source 92 provides power to one or more of the components in the system 200. The system 200 may include one or more different or identical tools 100 that may each be identical or may be different. In systems 200 with multiple tools 100, two or more of the tools 100 may be are grouped together in a tool cluster that mounts the tools 100 together on a frame. Cables 95 provide for power and/or data between the various components.

The system controller 90 controls the overall operation of the system 200. The controller 20 is typically housed in a cabinet or the like at some distance from the tool 100. The system controller 90 may include a control circuit with one or more processors and/or microcontrollers that controls the overall operation according to program instructions stored in memory. Various types of memory may be included for storing program instructions and data needed for operation, and other memory for storing temporary data required to carry out its operations. The system controller 90 may also include a user interface that may include one or more user input devices such as a keypad, touchpad, function keys, scroll wheel, or other type of computer input device. A display may also be included, such as a conventional liquid crystal display (LCD) or touch screen display which also functions as a user input device.

The tool controller 91 controls and monitors the operations of the tool 100. The controller 91 may include a control circuit and associated memory to act through program instructions to control the tool 100. Tool controller 91 may further include an interface and display for interaction with a user. In one embodiment as illustrated in FIG. 6, the tool controller 91 is a separate component that is in communication with the system controller 90. Other embodiments may include the functionality of the tool controller 91 performed by the system controller 90.

The tool controller 91 includes a servo amplifier 50 to monitor the tool 100. The servo amplifier 50 is operatively connected to the motor 11 in the base unit 10 to assist in its control. The servo amplifier 50 receives command signals regarding one or more of a desired velocity, torque, or position. The servo amplifier 50 monitors the status of the motor 11 and makes adjustments for the motor 11 to operate at the desired settings. The tool controller 91 is configured to include a separate servo amplifier 50 for each tool 100 in the tooling system 200. FIG. 6 includes a single tool 100 and thus a single servo amplifier 50. The tool controller 91 may be housed in a cabinet that facilitates adding and removing servo amplifiers 50 as needed.

A cabling system comprising cables 95 allows for communication between the components of the system 200. The cables 95 are configured for carrying various data signals. In one embodiment, the system 200 communicates through a LAN. In one embodiment, communications occur through a communications bus. The cabling system may further be configured to provide power from the power source 92 to the tool 100. The power source 92 may provide a single voltage, such as 24 VDC, or a plurality of voltages such as 380 VDC and 24 VDC depending on the type and number of tools 100.

Figure 7:
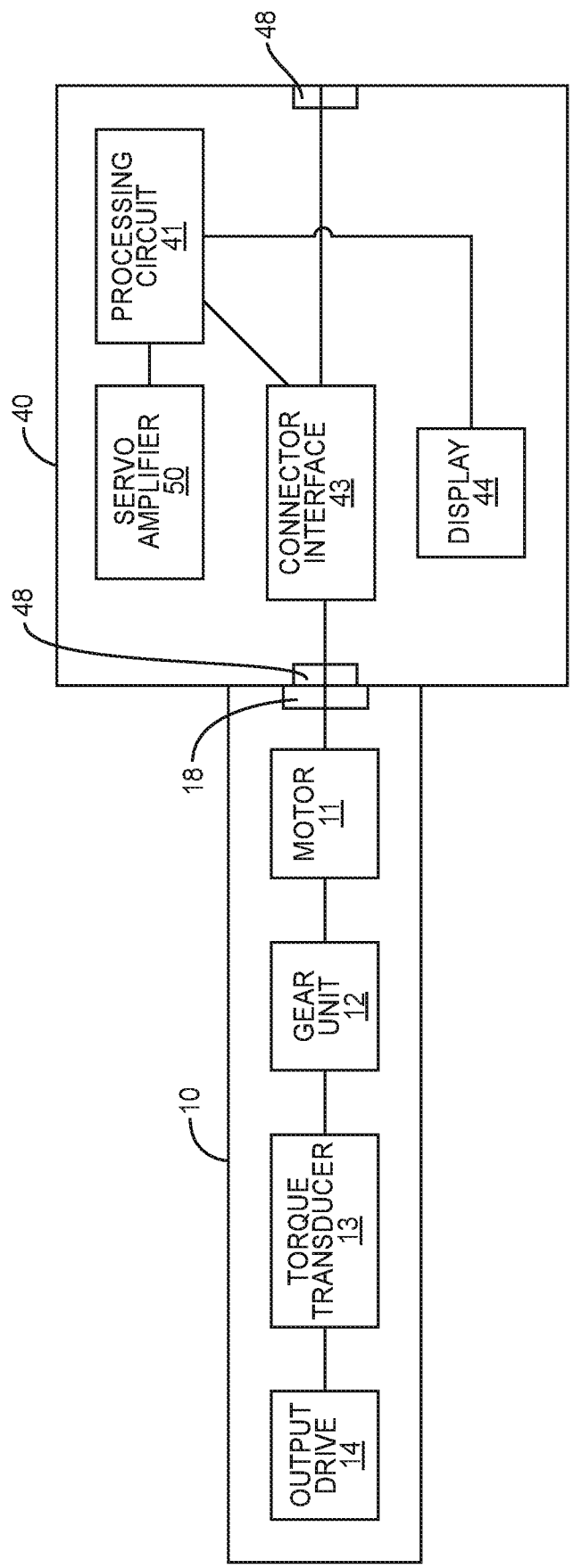
FIG. 7 is a schematic view of a tool in a second configuration with a base unit attached to a second module.
Figure 8:
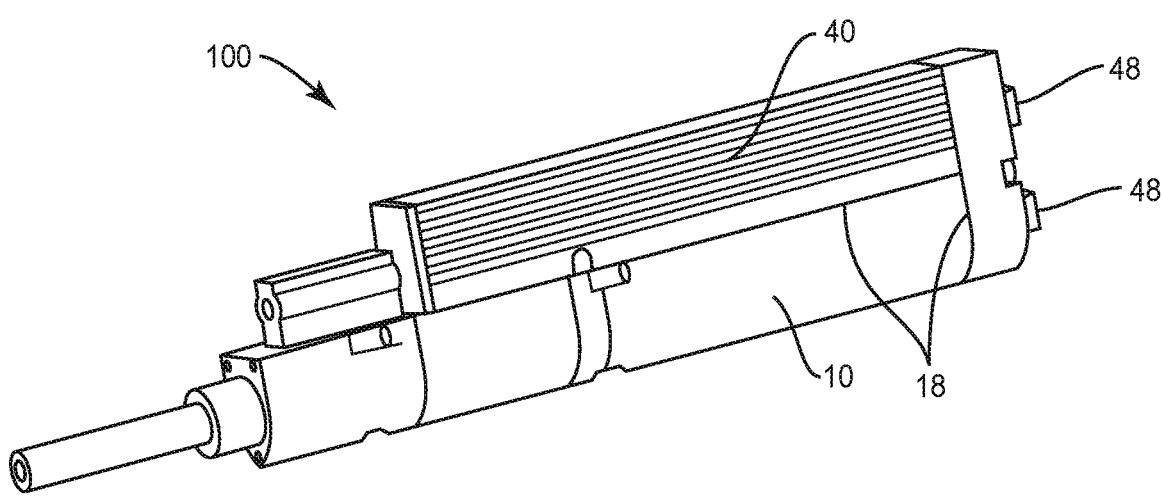
FIG. 8 is a perspective view of a tool of FIG. 7.

FIGS. 7 and 8 illustrate the tool 100 in a second tool configuration that includes the second module 40 attached to the base unit 10. The second module 40 includes a processing circuit 41, servo amplifier 50, a connector interface 43, and a display 44.

The processing circuit 41 receives measurement data from the torque transducer 13 and processes the data and then supplies some or all of the processed data to the interface 43 for communication with the control processor 90 and/or tool processor 91. The servo amplifier 50 is positioned within the module 40 and performs the same process as the remotely-located servo amplifier 50 of the first configuration (i.e., receiving command signals regarding one or more of a desired velocity, torque, or position; monitoring the status of the motor 11 and making adjustments for the motor 11 to operate at the desired settings). The servo amplifier 50 also converts the analog signals into digital signals. The servo amplifier 50 may include a pair of circuit boards with a first configured as a measuring board for the various monitored aspects and a second board for power and logic. The servo amplifiers 50 used for the first and second modules 30, 40 perform similar or identical functions, but have different electrical and structural aspects.

The display 44 may include indicators and/or a screen for indicating operational aspects of the tool 100. The display 44 may be the same as the display 32 described above. Display 44 may also include additional features such as one or more input devices for the operator to toggle between viewing the various different operational features. The connector interface 43 provides for supplying power from the power source 92 and transferring data to the control processor 90. The connector interface 43 may include one or more input and output ports, and may include an address device to send and receive signals from the control processor. In one embodiment, connector interfaces 43, 31 are the same.

The second module 40 is configured to attach to the base unit 10 in a similar manner as the first module 30. This may include one or more platforms with mechanical fasteners, rails, locking detents, corresponding ramp surfaces, and male and female connectors that provide for a frictional fit. In one embodiment, the attachment features are the same on the first and second attachments 30, 40. Thus, the attachments 30, 40 can be used interchangeably with the base unit 10. For example, a first job may require limited functionality for the tool 100 and thus the first module 30 may be attached to the base unit 10. Later, a second job may require additional functionality thus requiring the operator to remove the first module 30 and replace it with the second module 40.

The second configuration may be used in a system similar to that used with the first configuration. The difference between the two configurations is the servo amplifier 50 is located in the second module 40 in the second configuration (and not in the tool controller 91). This provides for more of the logic of the tool 100 to be placed on the tool itself instead of being located at a remote location.

One embodiment of a second configuration of a tool is disclosed in U.S. Pat. No. 7,090,031 which is hereby incorporated by reference in its entirety.

Figure 9:
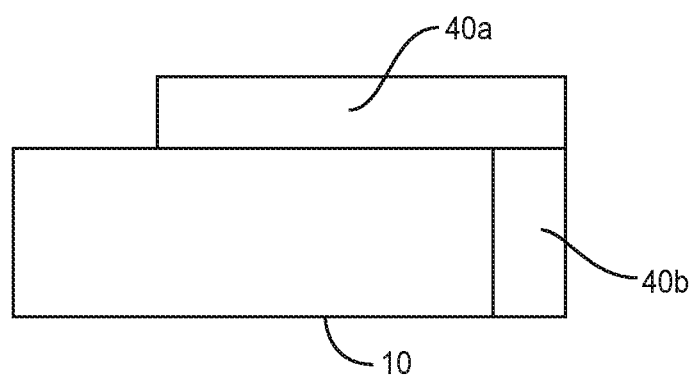
FIG. 9 is a schematic view of a tool in a second configuration with the second module including first and second sections.

The second module 40 may be constructed as a single unit, or may be constructed from multiple different units. FIGS. 7 and 8 include the second module 40 as a single unit. FIG. 9 illustrates an embodiment with the second module 40 including a first unit 40a and a second unit 40b. The separate units 40a, 40b may each include separate attachment features for connecting to the base unit 10 and/or other units. Further, the separate units may each include separate housings. The various components of the second module 40 may be divided into the separate units in a variety of different manners. In one embodiment, the servo amplifier 50 is in a first unit 40a, and a remainder of the components are housed in a second unit 40b.

The base unit 10 may be configured to receive each of the first and second modules 30, 40 at the same platform 18. That is, the first module 30 is attached to the platform 18 of the base unit 10 in the first configuration 100, and the second module 40 is attached to the same platform 18 in the second configuration. The tool 100 may also be configured for the different modules 30, 40 to attach to different platforms 18 on the base unit 10. Thus, the first module 30 attaches to a first platform 18 in the first configuration, and the second module 40 attaches to a different second platform 18 in the second configuration.

As illustrated in FIG. 5 with the first tool configuration, the first module 30 includes an exposed platform 38 with a single port for connecting with a cable 95 to the upstream components of the system 200. The single port provides for receiving power from the power supply 92 and communicating with at least one of the controllers 90, 91. A separate servo amplifier 50 is associated with each tool 100. Thus, for each tool 100, the system 200 includes a separate dedicated servo amplifier 50 in the tool controller 91. In relatively large tooling systems 200 with a large number of tools 100, multiple different tool controllers 91 may be employed to house the different servo amplifiers 50. Each of the tool controllers 91 may communicate with a common system controller 90.

The second tool configuration positions a dedicated servo amplifier 50 within each of the modules 40 on the tool 100. The system 200 includes a single tool controller 91 that oversees multiple tools 100.

Figure 10:
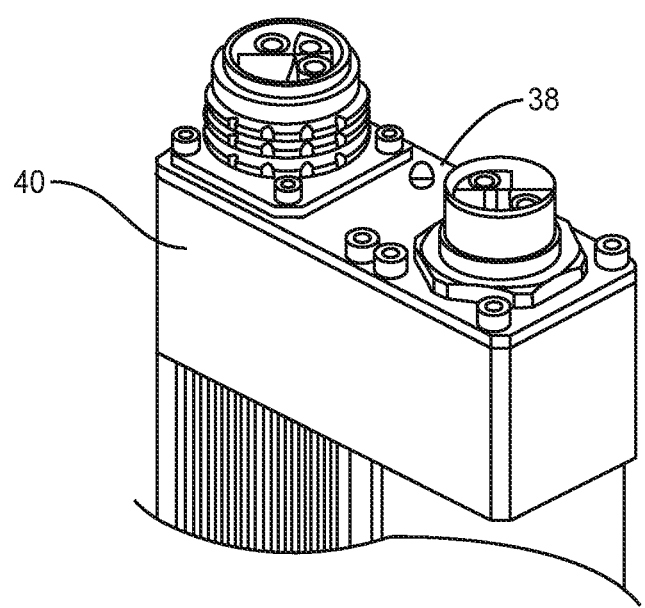
FIG. 10 is a partial perspective view of tool in a second configuration with a second module attached to a base unit.

The second tool configuration may also provide for the tools 100 to be connected together in a daisy-chain fashion. FIG. 10 illustrates a configuration of the second module 40 that provides for this configuration by having first and second ports on the platform 38. The first port is for connecting to an upstream node (such as the tool controller 91 or an upstream tool 100) and is configured for power and data. The second port is connected to a downstream node (another tool 100) and likewise is configured for power and data. The tools 100 are connected together with a first cable 95 connected to the first port and a second cable 95 connected to the second port. The last tool 100 in the string (i.e., the most-downstream tool 100) may include a termination cap on the second port to prevent farther downstream transfer of power and/or data. Thus, power and data to downstream components travel through the upstream tools 100.

Figure 11:
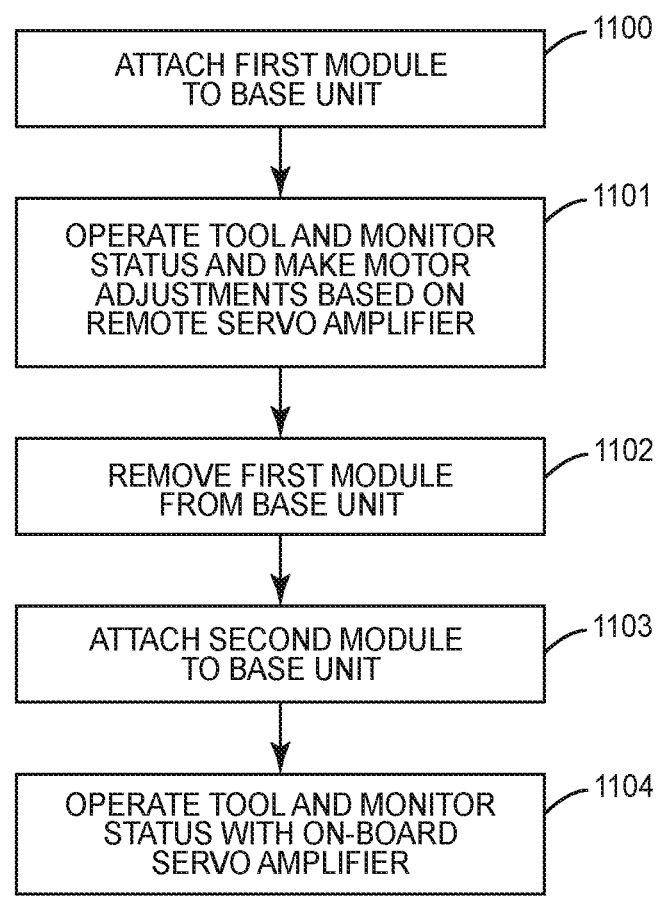
FIG. 11 is a process diagram of a method of using a tool with first and second modules.

FIG. 11 illustrates a process of using the tool 100. Initially, the first module 30 is attached to the base unit 10 (block 1100). This first tool configuration may occur when the environment requires that the servo amplifier 50 be remotely located. In one embodiment, this occurs when the harmonics that occur during tool usage cause damage or reliability issues with the servo amplifier 50. This may also occur when the tool is used in a particularly non-conducive physical environment (e.g., extreme cold, heat, wet). Once the first module 30 is attached, the tool is operated (block 1101). The remote servo amplifier 50 at the tool controller 91 monitors the process and may make operating adjustments accordingly.

Once the operation is complete, the first module 30 is removed from the base unit 10 (block 1102). The second module 40 is then attached to the bae unit 10 (block 1103). The tool 100 is then operated in the second configuration with the servo amplifier 50 on-board (block 1104).

The convertible design features of locating the servo amplifier depending upon the operational requirements of the tool have been described within the context of a spindle. The use of various electrically powered tightening spindles to help automate production processes is well known in the art. For example, such tightening spindles are commonly employed on an assembly line for the production of motor vehicles and the like where they are used to tighten screws or nuts. The convertible design features disclosed in this application are also applicable in other powered tools. Examples include but are not limited to robots, discrete automation, and manually-operated equipment.

The tools and tooling systems described above include a cabling system to provide for communication links between the different components. One or more of the components may also include a wireless interface, such as through a Bluetooth interface or wireless local area network (WLAN) interface. The wireless communication components may be located in each of the first and second modules 30, 40. In another embodiment, these are located in the base unit 10. Some embodiments feature a system 200 that includes a combination of cabling and wireless communications.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A tool that is convertible between one of a first configuration and a second configuration, the tool comprising:
  a base unit that receives power and data communications from a remote source, the base unit comprising:
    a motor;
    an output drive that is driven by the motor; and
    a housing that extends around the motor and the output drive, the housing comprising a mounting platform;
  a first module that does not include a servo amplifier, the first module comprising:
    a first connector interface; and
    a first housing that extends around the first connector interface, the first housing comprising a first mount;
  a second module comprising:
    a servo amplifier;
    a processing circuit;
    a second connector interface; and
    a second housing that extends around the servo amplifier, the processing circuit, and the second connector interface, the second housing comprising a second mount;
  the mounting platform of the base unit configured to removably connect to one of the first module and the second module;
  a first configuration with the base unit and the first module connected together to move as a single component, the first configuration comprising the first housing of the first module physically contacting the housing and electrically removably connected to the base unit with the power and data communications from the remote source that are received at the base unit passing through the first module with the remote source external to the base unit and the first module and to not move together with the base unit and the first module;
  a second configuration with the base unit and the second module connected together to move as a single component, the second configuration comprising the second housing of the second module physically contacting the housing and electrically removably connected to the base unit with the power and data communications from the remote source that are received at the base unit passing through the second module with the remote source external to the base unit and the second module and to not move together with the base unit and the second module.

2. The tool of claim 1, further comprising a base port positioned at the mounting platform, a first port positioned at the first mount, and a second port positioned at the second mount, the first configuration comprising the first port physically and electrically engaging with the base port of the base unit, and the second configuration comprising the second port physically and electrically engaging with the base port of the base unit.

3. The tool of claim 1, wherein the base unit further comprises a torque transducer and a gear unit.

4. The tool of claim 1, wherein the first module comprises a first display screen and the second module comprise a second display screen.

5. The tool of claim 1, wherein the motor of the base unit is configured to be adjustable based on signals received from a remote servo amplifier.

6. The tool of claim 1, wherein the servo amplifier comprises an analog-to-digital converter.

7. A method of operating a tool comprising:
  electrically and physically attaching a first module to a base unit with the first module positioned at a mounting position on the base unit, the first module does not include a servo amplifier;
  operating the tool in a first configuration and moving the base unit and the first module together as a single component while power and data from a remote source pass through the first module to the base unit with the remote source external to and spaced away from each of the base unit and the first module;
  removing the first module from the base unit;
  electrically and physically attaching a second module at the mounting position on the base unit where the first module was previously attached, the second module comprising a servo amplifier;
  operating the tool in a second configuration and moving the base unit and the second module together as a single component while the power and the data from the remote source pass through the second module to the base unit with the remote source external to and spaced away from each of the base unit and the second module; and
  monitoring a motor in the base unit with the servo amplifier in the second module while operating the tool in the second configuration.

8. The method of claim 7, further comprising engaging a base port on the base unit with a first port on the first module while the tool is in the first configuration and with a second port on the second module while the tool is in the second configuration.

9. The method of claim 7, further comprising performing analog-to-digital conversions of motor signals at the servo amplifier.

10. The method of claim 7, further comprising attaching the second module to a downstream tool and transferring power and data information through the second module to the downstream tool.

11. The method of claim 7, further comprising contacting a first housing of the first module against a housing of the base unit in the first configuration and contacting a second housing of the second module against the housing of the base unit in the second configuration.

12. The method of claim 7, further comprising deactivating the base unit by detaching both the first module and the second module from the base unit.

13. The method of claim 7, further comprising attaching a power and data cable to the first module in the first configuration and to the second module in the second configuration.

14. The method of claim 7, further comprising attaching the second module to the base unit and positioning the servo amplifier on the exterior of the housing of the base unit.

* * * * *